March 13, 1973  S. G. WARD  3,720,335
SNOWMOBILE LOADING AND UNLOADING DEVICE FOR PICKUP TRUCKS
Filed Nov. 5, 1971  3 Sheets-Sheet 1
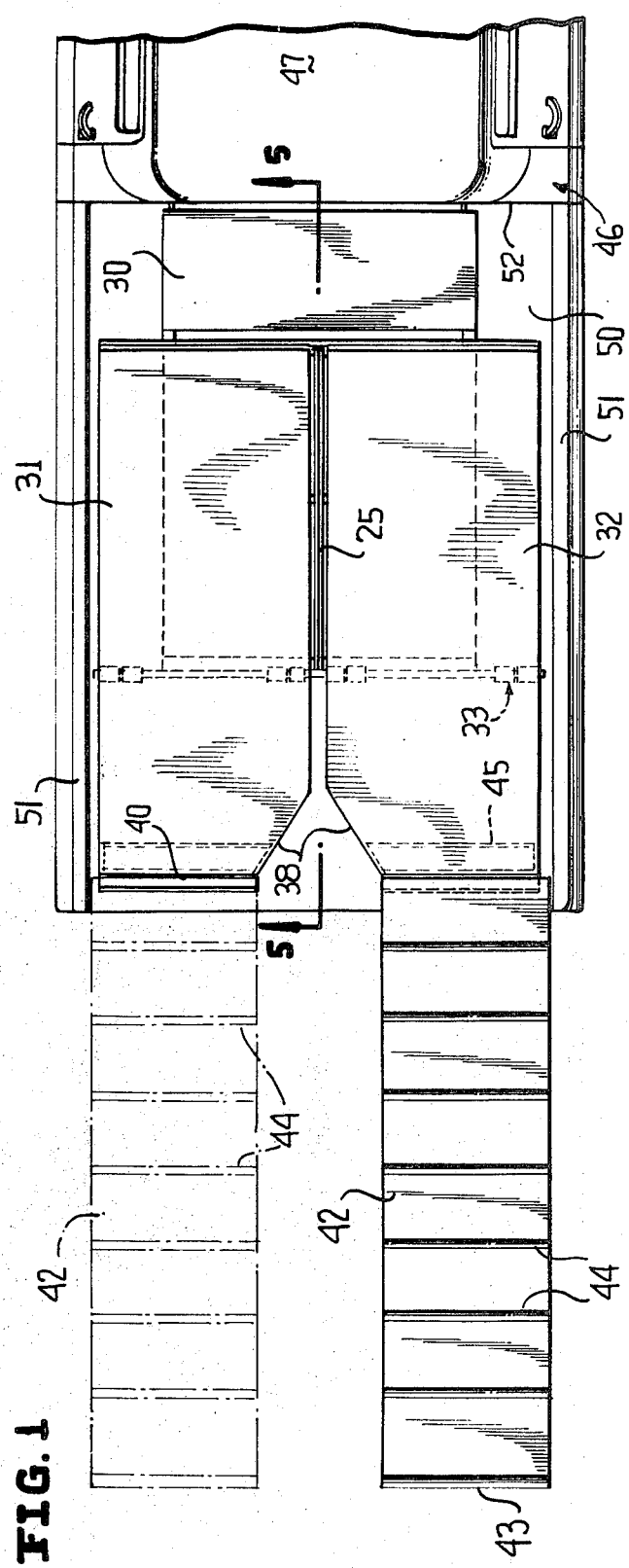
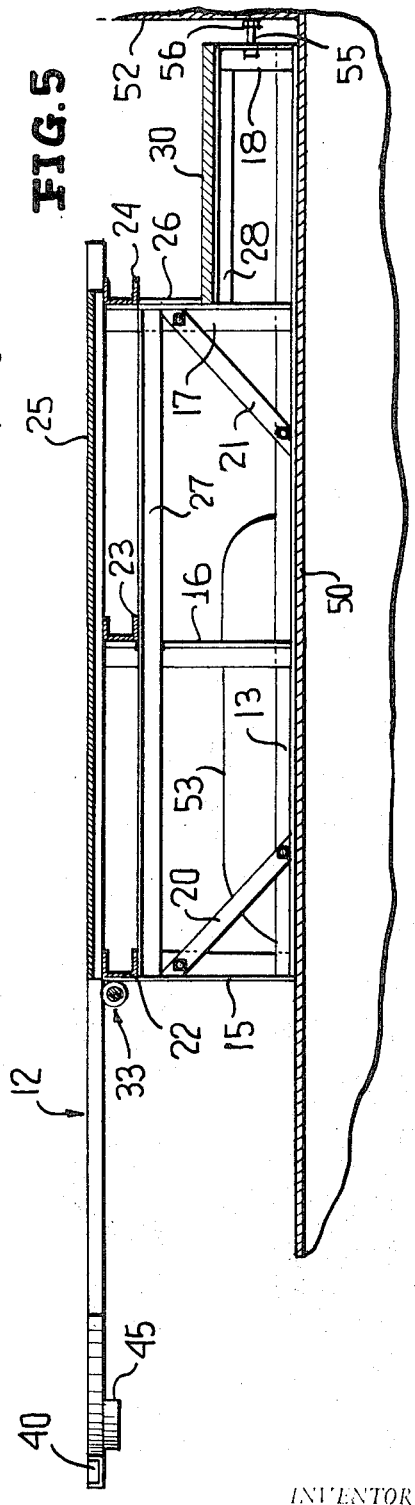
INVENTOR.
SONNE G. WARD March 13, 1973  S. G. WARD  3,720,335
SNOWMOBILE LOADING AND UNLOADING DEVICE FOR PICKUP TRUCKS
Filed Nov. 5, 1971  3 Sheets-Sheet 2
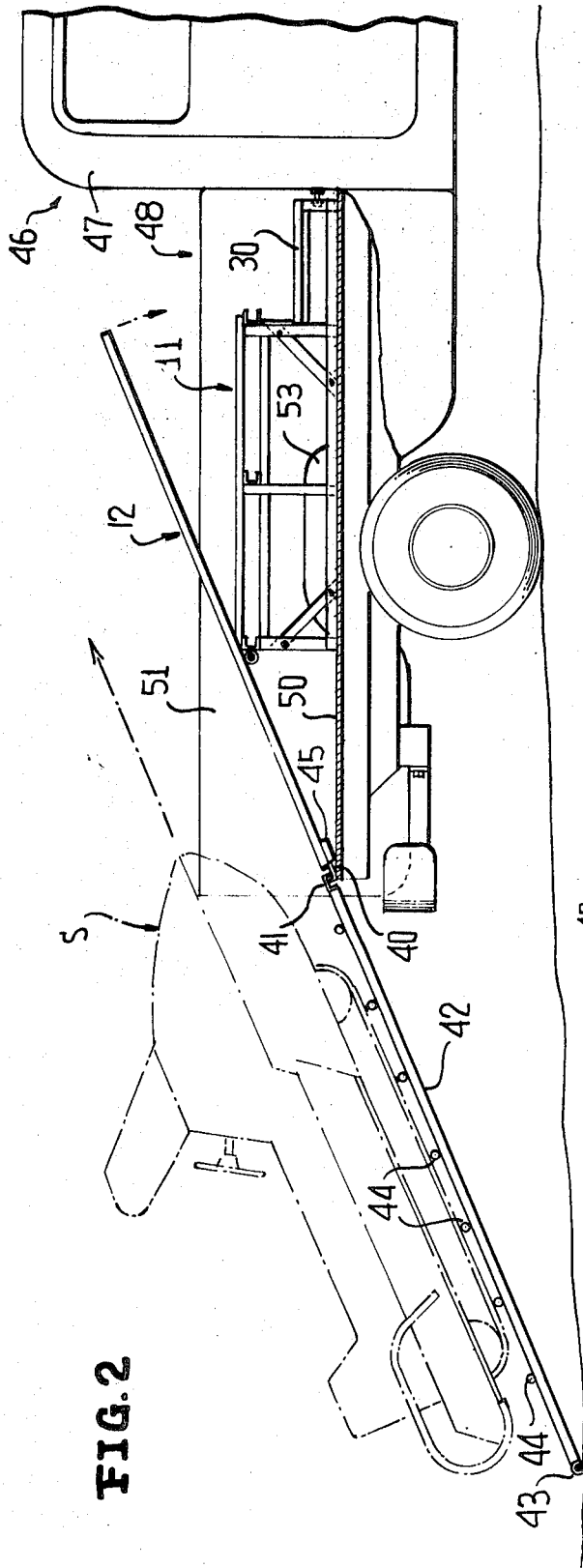
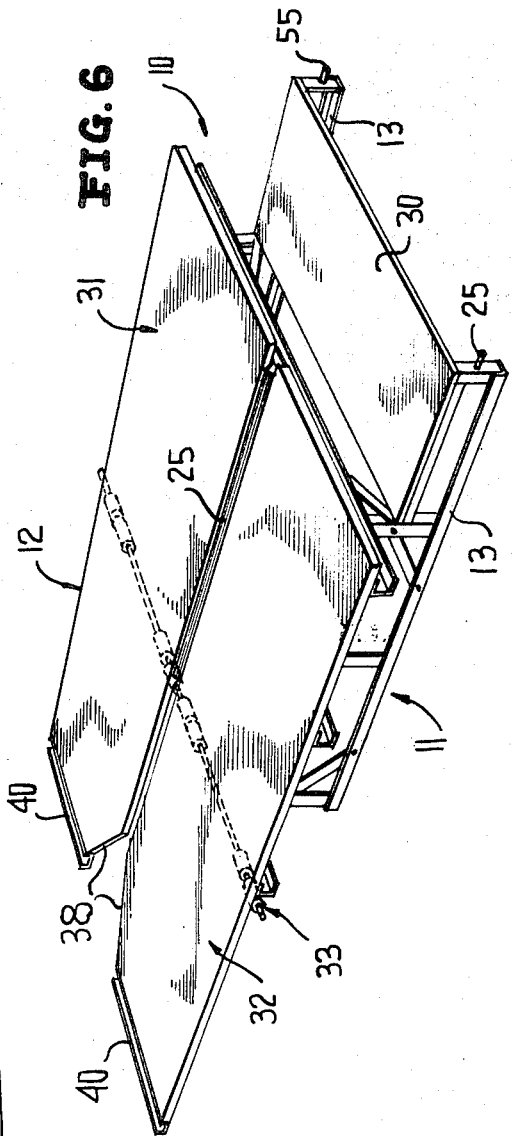
INVENTOR.
SONNE G. WARD

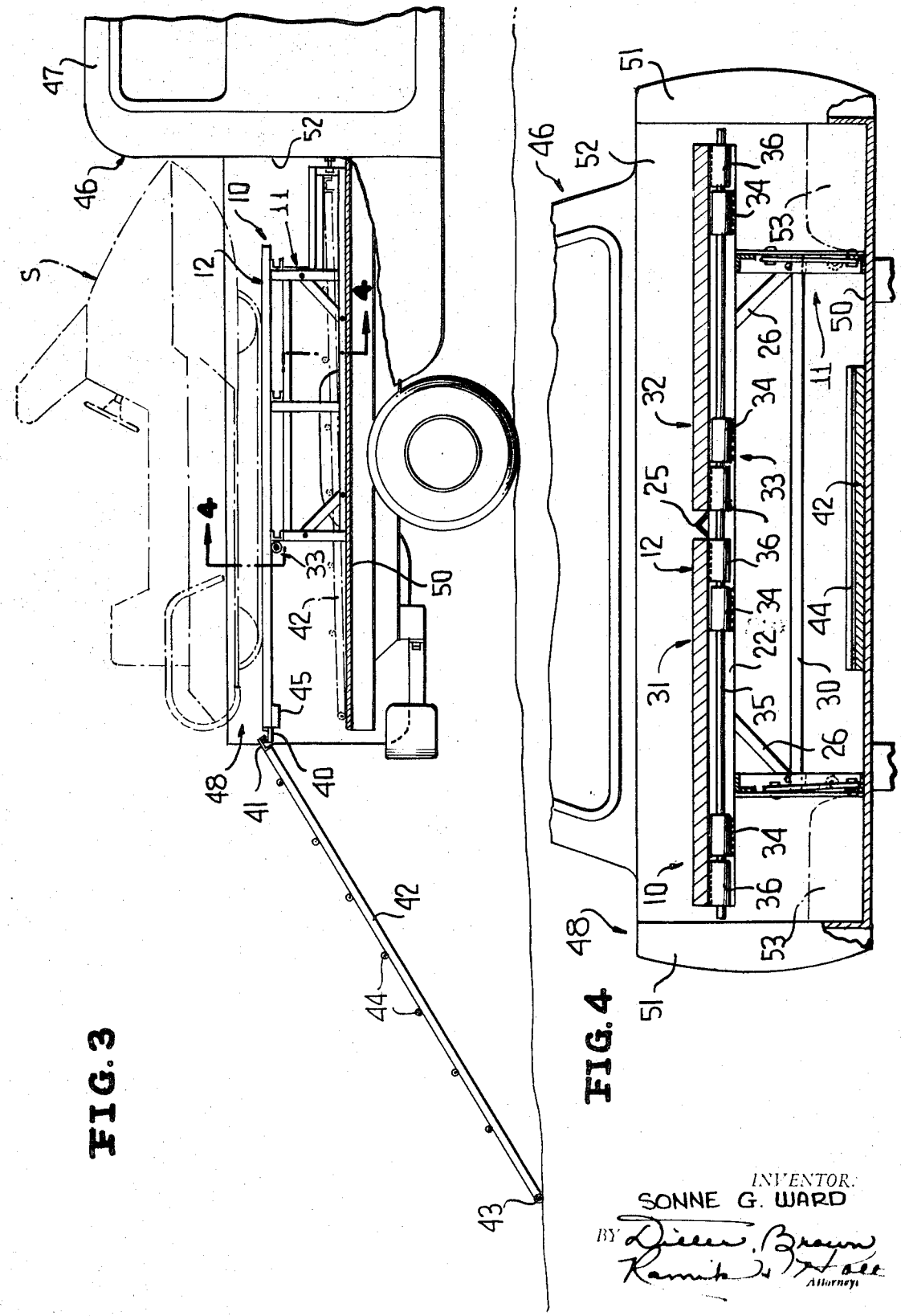

United States Patent Office 3,720,335
Patented Mar. 13, 1973

3,720,335
SNOWMOBILE LOADING AND UNLOADING
DEVICE FOR PICKUP TRUCKS
Sonne G. Ward, P.O. Box 117, Newdale, Idaho
Filed Nov. 5, 1971, Ser. No. 196,103
Int. Cl. B60p 1/28
U.S. Cl. 214—505                    13 Claims

ABSTRACT OF THE DISCLOSURE

This disclosure relates to a device which may be readily mounted within conventional pickup trucks for the transport of snowmobiles and like vehicles and wherein the device includes a base having a platform pivotally mounted thereon, the platform engaging the rear portion of the truck bed in the tilted position thereof and having associated therewith ramp means which are connected directly to the platform and forming generally a planar extension thereof. The device provides for a relatively flat loading and unloading angle and at the same time assures full support of the vehicle at all times during the loading and unloading thereof.

---

This invention relates in general to new and useful improvements in vehicle transport means, and more particularly to a device especially constructed for mounting within a pickup truck for the transport of a snowmobile and wherein the device has means for facilitating the loading and unloading of the snowmobile.

BACKGROUND OF THE INVENTION

It is well recognized that one of the most convenient means for transporting a snowmobile is a conventional pickup truck. Unfortunately, the width of many snowmobiles is in excess of the clearance between the wheel wells of the pickup truck body with the result that a special platform has to be mounted within the pickup truck.

While the bed of the pickup truck is relatively low to the ground as compared to many other types of trucks, once the platform has been mounted within the pickup truck body, the support position of the snowmobile is relatively high with the result that a relatively steep ramp is required in the loading and unloading of the snowmobile. It will be readily apparent that the steeper the ramp, the more difficult the loading and unloading is.

It will also be apparent that there is a sharp angle between the horizontal platform surface and the ramp surface with the result that during the loading and unloading of a snowmobile, the snowmobile must reach a point of only a partial support, with a resultant strain on the frame of the snowmobile, followed by an abrupt tilting of the snowmobile from a position of the support on one of the surfaces to a position of the support on the other of the surfaces. Unless there is extreme care in the handling of the snowmobile at the time of pivot, it will strike the new supporting surface with relatively great force with partial damage to the snowmobile.

SUMMARY OF THE INVENTION

In accordance with this invention it is proposed to provide a vehicle support which includes a base readily seatable on a pickup truck or like truck bed between the wheels thereof, and a platform pivotally mounted on the rear edge of the base for movement between a generally horizontal position supported by a base and a tilted position wherein the rear edge of the platform is supported by the truck bed adjacent the rear edge thereof. In this mounting of the platform, the platform, in its tilted position, functions as a ramp from the bed of the truck up onto the normal vehicle support position. Accordingly, it is only necessary that the ramp means be elevated sufficiently to provide a support for a vehicle from the ground up to the truck bed height.

One of the principal features of the invention is a great reduction in the rate of incline of the ramp means in order to facilitate the loading and unloading of the vehicle from its relatively elevated transport position.

Another feature of the invention is that as the vehicle being loaded and unloaded passes between the ramp means and the platform, there is substantially no change in the supporting of the vehicle so that at all times the vehicle, such as a snowmobile, is fully supported and does not have to rock from one supporting surface to another during the loading and unloading thereof.

Another feature of the invention is that during the loading of the snowmobile onto the truck, the snowmobile is positively supported and the only tilting of the snowmobile that occurs is when the snowmobile passes sufficiently on to the platform to reach a slightly over center position at which time the platform, while fully supporting the snowmobile, will pivot from its inclined position to its horizontal snowmobile supporting position. The reverse occurs when the snowmobile is being unloaded.

A further feature of the snowmobile support is that the balance of the platform is such that when the ramp means are attached thereto, the ramp means will overbalance the platform and automatically move the same to a loading position.

From the foregoing, it will be readily apparent that the tilting platform system, as briefly described, provides a much gentler slope for the snowmobile to be driven upon and allows the operator to slowly drive the machine onto the carrier with complete control and safety because the skiis of the snowmobile never leave the ramp or platform.

With the above, and other objects in view that will hereinafter appear, the nature of the invention will be more clearly understood by reference to the following detailed description, the appended claims and the several views illustrated in the accompanying drawings.

In the drawings:

FIG. 1 is a plan view of a pickup truck provided with the transport device with one ramp only being shown attached and the other being shown in phantom lines.

FIG. 2 is a side elevational view of the pickup truck and device of FIG. 1 and shows the device in position for the loading of a snowmobile, a side of the pickup truck body being broken away to illustrate the details of the device.

FIG. 3 is a view similar to FIG. 2 and shows the device with the snowmobile in its fully loaded position.

FIG. 4 is an enlarged fragmentary transverse sectional view taken on the line 4—4 of FIG. 3 and shows more specifically the details of construction of the device and the relationship thereof to the pickup body.

FIG. 5 is an enlarged fragmentary longitudinal sectional view taken along the line 5—5 of FIG. 1 and shows further the details of the device.

FIG. 6 is a perspective view of the device, without the ramps, removed from the pickup truck.

Referring now to the drawings in detail, it will be seen that there is illustrated in FIG. 1 the loading and unloading device which is generally identified by the numeral 10. The device 10 includes a base, generally identified by the numeral 11, on which there is mounted for tilting or pivotal movement a platform, generally identified by the numeral 12.

The base 11, as is best shown in FIGS. 5 and 6, includes a pair of longitudinally extending base members 13 which have extending upwardly therefrom supports 15, 16, 17 and 18 in that order from the front to the rear of the base members 13. The supports 15 and 17 are braced by diagonal braces 20 and 21, respectively.

The uprights 15, 16 and 17 are all of the same height and each pair of these uprights are connected together by respective transverse frame members 22, 23 and 24. The frame members 22, 23 and 24 are of a length in excess of the spacing of the frame members 13 so that they project transversely outwardly of the frame members 13. The frame members 22, 23 and 24 are connected together by a centrally located upper longitudinally extending frame member 25. In addition, diagonal braces 26 extend between intermediate portions of the supports 17 and the frame member 24.

It is to be noted that the supports 15 are shorter than the supports 16 and 17 with the transverse frame members 22 overlying the supports 15. The supports 15, 16 and 17 are further tied together by longitudinal frame members 27 which underlie the transverse frame members 22, 23 and 24 and which are also secured thereto.

The foregoing arrangement of frame members, uprights and diagonal braces provide for a very sturdy base construction.

The base 11 is completed by short longitudinal frame members 28 which are connected to the upper ends of the frame members 18, the frame members 18 being shorter as compared to the other frame members, and also to intermediate portions of the uprights 17. The frame members 28 are tied together by a platform 40 which is a fixed platform.

With particular reference to FIGS. 4 and 6, it will be seen that the platform 12 is formed in two halves 31 and 32 which are of a left and right configuration, as is best shown in FIG. 6. The platform halves 31, 32 are pivotally mounted on the base 11 by means of a pivot, generally identified by the numeral 33. The pivot 33 includes a plurality of sleeves 34 which are welded to the rear surface of the transverse frame member 22 in a spaced pattern arrangement and which have extending therethrough a pivot shaft 35. Suitably secured to intermediate portions of the platform halves 31, 32 are other pivot sleeves 36 which are mounted on the pivot shaft 35 and thus pivotally mount the platform halves 31, 32 on the base 11.

It will be readily apparent from FIGS. 2 and 3 that the pivoted position for the platform 12 is one wherein the platform 12 will normally be gravity-urged to a position seated on the base 11. This will be discussed in more detail hereinafter.

It will be noted that the inner rear corners of the platform halves 31, 32 are cut out as at 38 leaving a clearance opening. Each platform half 31, 32 terminates at its rear edge in an upwardly opening channel 40 with which a downwardly opening channel 41 (FIG. 2) at the leading edge of an associated ramp 42 may engage to interlock each ramp 42 with a respective one of the platform halves. It is to be noted that each ramp 42 is provided at its trailing edge with a rounded member 43 so as to facilitate the sliding thereof along the ground when the platform 12 pivots from a loading position to a supporting position. If desired, the upper surface of each ramp 42 may be provided with suitable transverse cleats 44 for the purpose of improving traction.

Preferably, the under surface of each platform half 31, 32 is provided with a support strip 45 adjacent the channels 40 thereof for the purpose of engaging a supporting surface in the pivoted position of the platform 12.

It is to be understood that the device 12 is intended to be mounted on a suitable transport vehicle, preferably a pickup truck and therefore, the use position of the device 10 is illustrated in conjunction with a pickup truck generally identified by the numeral 46. The pickup truck 46 is a customary pickup truck and includes a cab 47 and a body or bed 48, the body 48 including a floor 50, sides 51 and a front wall 52. The body 48 will also include a tail gate which is omitted for purposes of clarity. It is further to be understood that the interior of the body 48 will include conventional wheel wells 53 which interrupt the floor 50.

The transverse spacing of the frame members 13 is such that the base 11 may be readily slid between the wheel wells 53 with the frame members 13 either touching or being closely adjacent the wheel wells 53 so as to be transversely stabilized thereby.

The device 10 is suitably secured within the body 48 against longitudinal movement, Securing means may, for example, be in the form of bolts 55 carried by the uprights 18 and nuts 56 welded to the front wall 52.

It is to be noted from FIGS. 3 and 4 that when the device 10 is mounted within the truck body 48, the transverse frame members 22 are sufficiently elevated above the wheel wells 53 to clear the same even though the wheel wells will vary in height from one truck body to another. At the same time, it is to be noted that the overall width of the device 10 is substantially equal to that of the interior of the truck body 48 so as to provide for a maximum supporting of the vehicle to be transported. Finally, it is to be noted that the upper surface of the platform 12 is below the upper surface of the sides 51 of the truck body so that the sides will prevent a vehicle supported on the platform 10 from moving transversely thereoff.

It is further pointed out at this time that the platform 30 may be utilized for the storage of tool boxes, gasolene cans, etc. while at the same time the ramps 42 may be readily stored within the base 11, as is shown in FIG. 4.

OPERATION

With the device 10 mounted within the truck body 48, when it is desired to load the vehicle, such as the snowmobile S, it is merely necessary to lower the tail gate (not shown), then withdraw the ramps 42 from their storage positions and attach the same to the rear edges of the platform halves 31, 32. This is accomplished by a simple interlocking of the channels 40, 41.

The balance of the platform halves 31, 32 is such that they are normally fully seated on the base 11. At the same time, when the ramps 42 are attached to the platform halves, they will tilt to a position where they engage the truck floor 50 in the manner shown in FIG. 2. The lengths of the ramps 42 will be such that the ramps 42 will lie in substantially the same plane as the platform 12 in its tilted position. This, of course, requires a proper proportion of the height of the base 11 with respect to the length of the platform 12 and the pivot point thereof and the height of the truck floor 50 and the length of the ramps 42.

Once the ramps 42 in the platform 12 have assumed the position illustrated in FIG. 2, the snowmobile S may then be driven up onto the ramps 42 and then onto the platform 12. It will be readily apparent that the snowmobile will be fully supported by the ramps 42 and the platform 12 at all stages during the loading operation. After the snowmobile is driven off the ramps 42 on to the platform 12, further forward movement of the snowmobile on the platform 12 will result in the snowmobile reaching an overbalanced position at which the platform 12 would gently tilt back to its horizontal transport position as is shown in FIG. 3. At this time, the forward ends of the ramps 42 will be elevated and the ramps will be drawn forwardly to the position shown in FIG. 3. Thereafter, the ramps 42 may be disengaged from the platform 12 and returned to their storage position, after which the tailgate may then be returned to its normal body closing position. When a tailgate is provided on the truck body 48 it will also serve as a rear support against the rearward movement of the snowmobile out of the truck body.

In the unloading of the snowmobile, the procedure is generally reversed. That is, the ramps 42 are positioned as shown in FIG. 3, after which the operator of the snowmobile enters the same and slowly backs it up. At this time the platform 12 will tilt downwardly from its horizontal position of FIG. 3 to its tilted position of FIG. 2 with the result that the forward ends of the ramps 42 will be lowered and the rear ends of the ramps will move away from the truck so that the ramps assume the position shown in FIG. 2. Thereafter, the snowmobile S may be readily backed down the ramps 42 onto the ground or other supporting surface.

At this time it is pointed out that with certain models of the snowmobile it is feasible for the operator to lean backwards to a position overbalancing the remainder of the snowmobile and the platform 12 so that the platform 12 may tilt to the position of FIG. 2 even before the snowmobile is moved relative to the platform 12.

It is also to be understood that where necessary, suitable tie-down means may be provided, but these are within the discretion of the user of the device 10.

Although only a preferred embodiment of the invention has been specifically illustrated and described herein, it is to be understood that minor variations may be made in the loading and unloading device without departing from the spirit and scope of the invention as defined by the appended claims.

I claim:

1. In combination with a small bed truck of the type including a pickup truck, a vehicle support particularly adapted for transporting and loading and unloading a vehicle of the type including tracked vehicles such as snowmobiles, said vehicle support comprising a base having means removably mounting the same on said bed, a pivot carried by said base at a rear edge thereof above said bed, a platform mounted on said base by said pivot generally centrally of said platform for tilting movement between said base and a tilted position having a rear edge thereof seated on said bed immediately adjacent a rear edge of said bed, and ramp means removably cooperably engaged with said platform in overlying relation to said bed as an extension thereof without interference from said bed.

2. The vehicle support of claim 1 wherein the relationship between said platform, said base and said ramp means is one wherein in the tilted position of said platform, said platform and said ramp means are substantially planar and providing for a full support of a vehicle in all positions of loading and unloading.

3. The vehicle support of claim 1 wherein said base has a storage area therein for said ramp means.

4. The vehicle support of claim 1 wherein said platform includes separately pivotal longitudinal halves, and said ramp means includes a separate ramp for each platform half.

5. The vehicle support of claim 1 wherein said pivot is connected to said platform off center of the longitudinal center thereof in a position effecting an off balance condition assuring the normal seating of said platform on said base.

6. The vehicle support of claim 5 wherein said ramp means are of a weight to overbalance said platform and tilt said platform to a vehicle loading position.

7. The vehicle support of claim 1 wherein said base is of a construction to be seated on a transport bed with said pivot being spaced from an edge of said transport bed a distance wherein when said platform is in said tilted position said ramp means are free of interference from said transport bed.

8. The vehicle support of claim 1 wherein said vehicle support is particularly adapted for mounting in a transport having upstanding sides, and said base is of a height positively lesser than the height of the transport sides whereby the transport sides may function to retain a vehicle on said platform.

9. The vehicle support of claim 1 wherein said base includes a lower frame of a width to seat between obstructions of a transport of the type including wheels, wheel wells and the like, and said platform and upper portions of said base being of a width and height to overlie such obstructions.

10. The combination of claim 1 wherein the proportional height of said bed and said base and the lengths of said platform and ramp means together with the position of said pivot relative to said bed rear edge being one wherein in the tilted position of said platform said ramp means and said platform lie generally in a common plane.

11. The combination of claim 1 together with releasable securing means for preventing longitudinal shifting of said base on said bed.

12. The combination of claim 1 wherein said bed is interrupted by wheel wells, and said base has a lower portion of a width to seat between said wheel wells and an upper portion of a width to overlie said wheel wells.

13. The combination of claim 1 wherein said truck has sides projecting upwardly along opposite sides of said bed, and said platform is disposed below upper edges of said truck sides whereby said truck sides retain a vehicle on said platform.

References Cited

UNITED STATES PATENTS

| | | | |
|---|---|---|---|
| 2,789,715 | 4/1957 | Filipoff et al. | 214—85.1 X |
| 3,536,214 | 10/1970 | Sorg | 214—85 |
| 3,613,920 | 10/1971 | Flamm | 296—3 X |

ALBERT J. MAKAY, Primary Examiner

U.S. Cl. X.R.

214—85